United States Patent
Jouiad et al.

(10) Patent No.: US 12,545,996 B2
(45) Date of Patent: Feb. 10, 2026

(54) PROCESS FOR DIRECT DEPOSITION OF GRAPHENE OR GRAPHENE OXIDE ONTO A SUBSTRATE OF INTEREST

(71) Applicant: UNIVERSITE PICARDIE JULES VERNE, Amiens (FR)

(72) Inventors: Mustapha Jouiad, Amiens (FR); Mimoun El Marssi, Dury (FR); Michael Lejeune, Amiens (FR)

(73) Assignee: UNIVERSITE PICARDIE JULES VERNE, Amiens (FR)

( * ) Notice: Subject to any disclaimer, the term of this patent is extended or adjusted under 35 U.S.C. 154(b) by 0 days.

(21) Appl. No.: 18/707,196

(22) PCT Filed: Nov. 3, 2022

(86) PCT No.: PCT/EP2022/080712
§ 371 (c)(1),
(2) Date: May 3, 2024

(87) PCT Pub. No.: WO2023/079018
PCT Pub. Date: May 11, 2023

(65) Prior Publication Data
US 2025/0163572 A1    May 22, 2025

(30) Foreign Application Priority Data
Nov. 4, 2021 (EP) .................... 21306551

(51) Int. Cl.
*C23C 16/26* (2006.01)
*C23C 16/458* (2006.01)
*C23C 16/505* (2006.01)

(52) U.S. Cl.
CPC ............ *C23C 16/26* (2013.01); *C23C 16/458* (2013.01); *C23C 16/505* (2013.01)

(58) Field of Classification Search
CPC ............................. C01B 32/198; C23C 16/28
See application file for complete search history.

(56) References Cited

U.S. PATENT DOCUMENTS

| 2006/0131713 A1* | 6/2006 | Fukazawa | ............. H01L 23/481 257/E21.597 |
| 2010/0200839 A1* | 8/2010 | Okai | ....................... C30B 25/02 977/734 |

(Continued)

FOREIGN PATENT DOCUMENTS

| GB | 2539016 | 12/2016 | |
| GB | 2539016 A * | 12/2016 | ............. C23C 16/26 |

(Continued)

OTHER PUBLICATIONS

Sakli et al. Optical properties of polymerized ethylene thin films deposited by PECVD technique. Optical and Quantum Electronics. vol. 53. Nov. 2, 2021 (Year: 2021).*

(Continued)

*Primary Examiner* — Cachet I Proctor
(74) *Attorney, Agent, or Firm* — SALIWANCHIK, LLOYD & EISENSCHENK

(57) ABSTRACT

The present invention pertains to a process for direct deposition of graphene oxide onto a substrate of interest from a gaseous source of at least one carbon precursor, using a plasma-enhanced chemical vapor deposition method. It is also directed to a device for implementing this process.

13 Claims, 6 Drawing Sheets

(56) References Cited

U.S. PATENT DOCUMENTS

| | | | | |
|---|---|---|---|---|
| 2011/0143034 A1* | 6/2011 | Ahn | ............................ | C23C 14/12 |
| | | | | 427/249.6 |
| 2014/0044885 A1* | 2/2014 | Boyd | ........................ | B01J 19/22 |
| | | | | 118/697 |
| 2014/0264059 A1* | 9/2014 | Baluja | .............. | H01L 21/67115 |
| | | | | 250/393 |
| 2015/0023860 A1* | 1/2015 | Lee | ........................ | C23C 16/325 |
| | | | | 423/325 |
| 2015/0179743 A1* | 6/2015 | Niyogi | ................ | H10D 62/882 |
| | | | | 257/29 |
| 2015/0318432 A1* | 11/2015 | Zhang | .................... | H10F 19/33 |
| | | | | 438/57 |
| 2019/0085457 A1* | 3/2019 | Ifuku | ................... | H01L 21/0262 |
| 2019/0345609 A1* | 11/2019 | Chen | ................. | H01L 21/02658 |

FOREIGN PATENT DOCUMENTS

| | | | | |
|---|---|---|---|---|
| WO | WO 2013/126671 | | 8/2013 | |
| WO | WO-2013126671 A1 * | | 8/2013 | ......... H01J 37/32522 |

OTHER PUBLICATIONS

Fujita et al. Near room temperature chemical vapor deposition of graphene with diluted methane and molten gallium catalyst. Scientific Reports. vol. 7. Sep. 28, 2017 (Year: 2017).*

Pekdemir et al. Low temperature growth of graphene using inductively-coupled plasma chemical vapor deposition. Surface and Coatings Technology. vol 309. pp. 814-819. Jan. 15, 2017 (Year: 2017).*

Written Opinion in International Application No. PCT/EP2022/080712, Feb. 9, 2023, pp. 1-6.

Sakli, A. et al. "Optical properties of polymerized ethylene thin films deposited by PECVD technique" *Optical and Quantum Electronics*, published online Nov. 2, 2021, pp. 1-13, vol. 53.

Wei, D. et al. "Critical Crystal Growth of Graphene on Dielectric Substrates at Low Temperature for Electronic Devices" *Angewandte Chemie*, 2013, pp. 14371-14376, vol. 125.

Adetayo, A. et al. "Synthesis and Fabrication of Graphene and Graphene Oxide: A Review" *Open Journal of Composite Materials*, Apr. 29, 2019, pp. 207-229, vol. 9.

* cited by examiner

PROCESS FOR DIRECT DEPOSITION OF GRAPHENE OR GRAPHENE OXIDE ONTO A SUBSTRATE OF INTEREST

CROSS-REFERENCE TO RELATED APPLICATION

This application is the U.S. national stage application of International Patent Application No. PCT/EP2022/080712, filed Nov. 3, 2022.

The present invention pertains to a process for direct deposition of graphene or graphene oxide onto a substrate of interest from a gaseous source of at least one carbon precursor, using a plasma-enhanced chemical vapor deposition method. It is also directed to a device for implementing this process.

BACKGROUND OF THE INVENTION

Graphene is a bidimensional crystal having a thickness of 0.34 nm which consists of $sp^2$ carbon atoms arranged in a honeycomb lattice. Graphene belongs to a number of allotropic forms of carbon, which also include carbon nanotubes, fullerene or graphite. This material is characterized by a high electrical conductivity (which varies depending on its preparation process), good mechanical properties (graphene would be 300 times tougher than steel at the same thickness and harder than diamond) and thermal conductivity, while being transparent. Graphene further provides a barrier to water and UV. Due to this range of performance characteristics, graphene thus represents a perfect candidate for a variety of potential applications, including in the field of nano- and microelectronics and especially in field-effect transistors; in photovoltaic devices and Organic Light-Emitting Diodes (OLED), in which graphene may be incorporated into transparent electrodes; in the field of energy and especially as an electrode material in lithium-ion batteries or in supercapacitors; in the manufacture of composite materials based on thermoplastic or thermoset polymers or of cement; in coatings, for instance to enhance the fire retardancy or abrasion resistance of a substrate; in biosensors; or in biomedicals. Graphene may in particular be used in the manufacture of flexible and transparent electronic components, such as touch screens.

In these applications, graphene is used as single-layer graphene on a substrate or as self-supported single-layer graphene, as few-layer graphene (2-5 carbon layers), as multi-layer graphene (5-10 carbon layers), as graphene nanoplatelets or as graphene powder. The presence of graphene is usually confirmed by Raman spectroscopy to identify $sp^2$ bonded carbon or by Atomic Force Microscopy (AFM) to measure the actual number of carbon layers.

It has also been suggested to use graphene oxide in many of the applications for which graphene is suitable. Graphene oxide is also a single-atomic-layered material which, contrary to graphene, is hydrophilic and acts as an electrical insulator. Graphene oxide (or GrO) may be reduced to graphene-like sheets (rGrO) also known as functionalized graphene.

Among the techniques for producing graphene, mention can be made of Chemical Vapor Deposition (CVD). This method typically involves reacting $CH_4$ and $H_2$ at high temperature (800-1000° C.) to produce carbon in the vapor phase, which then absorbs in a catalyst (typically a transition metal such as nickel or copper) that has been pre-introduced into the reactor. Generally, these catalysts are in the form of metal sheets with polycrystalline grains. Depending on the grain orientation, a number of Gr layers are formed on the catalyst.

One major drawback of the CVD technique is that graphene is deposited onto the catalyst, which requires the additional step of transferring graphene thus formed onto the substrate of interest, for instance a dielectric substrate for electronic applications. For this purpose, a wet bench may be used to chemically attack the metal catalyst with appropriate strong acidic compounds. After chemical etching, a graphene thin layer is found floating on the top surface of the acidic solution and collected with a special tool. The collected layer is then rinsed with water before transferring it onto the substrate of interest. These transfer steps are obviously tedious. In addition, because they may induce contamination and structural defects, these steps may detrimentally affect the performances of graphene.

Among the CVD techniques, PECVD (for Plasma-Enhanced CVD) consists in substituting part of the energy of the CVD process by the energy of ionization provided by a radiofrequency (RF) or microwave (MW) plasma. The energetic electrons generated by the plasma boost the ionization, excitation and dissociation of the hydrocarbon precursors at relatively low temperature. This technique has gained acceptance because of its ability to grow graphene directly on desired substrates in the absence of metal catalysts.

However, the attempts to grow graphene by PECVD have failed to produce graphene at a temperature of lower than 475° C. on a catalytic substrate (K. J. Peng et al., *J. Mater. Chem.*, C 2013, 1, 3862) and at a temperature of lower than 450° C. on a dielectric substrate (D. C. Wei et al., *Angew. Chem. Int. Ed.* 2013, 52, 14121).

All the above methods use methane as a carbon precursor. However, methane is a greenhouse gas, which is regarded as 25 times as potent as carbon dioxide at trapping heat in the atmosphere. Besides, methane may function as an asphyxiant at high concentrations, which requires special measures for using it as a reactant in an industrial environment.

It has already been suggested in U.S. Pat. No. 9,150,418 that methane may be substituted by various other carbon precursors such as ethylene in a PECVD process. However, this process is generally conducted at a temperature of 800° C. FIGS. 4 and 6 of this patent describe an alternative process conducted at room temperature. In the process shown on FIG. 6, the substrate (such as a copper foil or another substrate) is maintained in a low-pressure environment, then hydrogen and methane are flown into the processing chamber at room temperature and a RF plasma is initiated, whereby graphene is said to be formed onto the substrate. FIG. 4 describes a similar process in which the RF plasma is extinguished before $H_2$ and $CH_4$ are flown into the processing chamber. Similarly to the prior art referred to above, these embodiments use methane as a carbon precursor. In addition, this document makes clear that a carrier gas, preferably hydrogen, should be flowed with the carbon precursor inside the processing chamber in order to form graphene and simultaneously remove copper oxide from the substrate surface.

In this context, there remains the need to provide a process for direct deposition of graphene onto a substrate of interest, under industrially and economically acceptable conditions, i.e. without the use of toxic reactants, polluting metal catalysts and/or high temperatures.

The inventors have now found that this need may be satisfied by substituting methane, which was used as a carbon precursor in the above processes, with ethylene in the absence of any carrier gas, thus allowing to grow graphene at about room temperature.

SUMMARY

This invention thus pertains to a process for depositing graphene or graphene oxide onto a substrate from a gaseous source of at least one carbon precursor, using a plasma-enhanced chemical vapor deposition method, characterized in that the carbon precursor consists of ethylene and in that the process is carried out at a temperature between 18 and 40° C. and in the absence of carrier gas.

It also pertains to a device suitable for the production of graphene or graphene oxide on a substrate, comprising:
- a container comprising a gaseous source of carbon precursors consisting of ethylene,
- a plasma reactor comprising: (a) a plasma chamber comprising a sample stand suitable for holding a substrate, and (b) a plasma generator comprising a power source and connected to, or including, the plasma chamber,
- a pumping system suitable for putting the plasma chamber under vacuum and in fluid communication with the plasma chamber, and
- means for feeding ethylene from the container into the plasma chamber.

The process of this invention makes use of ethylene, which is a non-harmful gas. In addition, it is conducted at a temperature around room temperature, and is thus less energy consuming and well suited for the deposition of graphene onto substrates which are sensitive to high temperatures. Therefore, the process of this invention may be directly applied to a diversity of substrates. This process further allows omitting any prior step of treating the substrate, for instance by cleaning it with a plasma. Furthermore, the process of this invention makes it possible to grow high quality, large area graphene, for instance products of about 15×15 cm² or even 100 cm² or 200 cm². The device according to this invention is also less expensive than prior art devices, since it does not require a furnace.

DETAILED DESCRIPTION

The process according to this invention comprises depositing graphene or graphene oxide onto a substrate from a gaseous source of at least one carbon precursor, namely ethylene.

The substrate may be made of any material and, for instance, may be selected from: glass; cellulosic materials such as paper or wood; synthetic organic materials such as polystyrene or polyesters, in particular polyethylene terephthalate or poly(lactic acid) including poly(L-lactic acid) and poly(D,L-lactic acid); a metal, preferably other than nickel and copper; a metal oxide or a metal carbide, such as silica, alumina or sapphire; and silicates such as aluminum and/or magnesium silicates. The substrate may have any shape and does not need to be flat.

In this invention, deposition is performed by means of a plasma-enhanced chemical vapor deposition (PECVD) method. The plasma may be generated by direct current, by microwaves or preferably by radiofrequency (RF) which uses high frequency voltages. The power provided to the plasma is typically comprised between 150 W and 400 W, preferably of about 300 W.

This process is conducted in the absence of carrier gas, in particular any gas selected from: hydrogen, argon, nitrogen, halogens such as chlorine, and mixtures thereof. This process may however be performed after single flash of oxygen between 5 sccm and 20 sccm, preferably 10 sccm, for 30 seconds to 120 seconds, preferably 60 seconds, to form graphene oxide instead of graphene. In addition, ethylene is used as the sole gas source of carbon precursor. The flow rate of the gas source may be between 5 sccm and 20 sccm, and is preferably of about 10 sccm.

As mentioned above, the process of this invention, including both the deposition and the optional single flash of oxygen, is carried out at a temperature between 18 and 40° C., for instance between 20 and 30° C. It is typically performed for a duration allowing the formation of the required number of graphene or graphene oxide layers, such as 2 seconds to 10 seconds and preferably 5 seconds for forming a single graphene layer and 40 seconds to 80 seconds and preferably 1 min for forming a single graphene oxide layer. In addition, this process is usually carried out at a pressure of between $1.33 \times 10^{-5}$ bar and $4 \times 10^{-5}$ bar, preferably of about $1.8 \times 10^{-5}$ bar.

Once the required layers have been deposited, the flow of ethylene is discontinued and the substrate can then be removed from the plasma chamber.

It is thus possible to form graphene or graphene oxide directly onto the substrate in one single step. Since this substrate does not need to have catalytic properties but can be any substrate of interest, the process of this invention generally does not include a subsequent step of transferring the graphene to another substrate. In addition, this process usually does not include any pre-treatment step of the substrate, such as hydrogen or argon plasma treatment, chemical etching, physical machining, ion beam bombardment, ultrasonic cleaning, electropolishing, or laser ablation. In the case where the plasma chamber is used for other purposes than the process of this invention, this process could include a preliminary step of cleaning the plasma chamber, for instance by flowing argon within the chamber, optionally in the presence of the substrate.

This invention also pertains to a device suitable for the implementation of the process described above. This device thus comprises a container comprising a gaseous source of carbon precursors consisting of ethylene. The container is in fluid communication with a plasma reactor, which comprises a plasma generator and a plasma chamber comprising a sample stand suitable for holding a substrate. Means are provided for feeding ethylene from the container into the plasma chamber. In the case where graphene oxide should be formed, the device of this invention may further include means for introducing oxygen within the plasma chamber. Mass flow controllers may be provided to control the flow of the gas sources. The device of this invention further comprises a pumping system suitable for putting the plasma chamber under vacuum. One or more pressure gauges and optionally one or more vacuum control valves may be provided in the vacuum lines connecting the pumping system with the plasma chamber. The plasma chamber may be in the form of a tube and is typically made of quartz, alumina, glass or of any other non-reactive material. According to an embodiment of this invention, the device may further comprise means for tilting, rocking or rotating the sample stand within the plasma chamber, thus allowing several or all sides of the substrate to be coated with graphene or graphene oxide. In addition, in order to control graphene formation, the plasma chamber may be coupled with optical devices and in particular with an optical spectrometer connected to the plasma chamber by means of a fiber optic cable. Alternatively or additionally, the plasma chamber may be connected with a mass spectrometer to detect and analyze byproducts such as hydrogen produced during graphene formation.

Finally, the plasma chamber is generally provided with means for pumping gas (such as hydrogen produced during graphene formation) out of the plasma chamber.

The plasma chamber is connected to, or at least partly included within, the plasma generator which comprises a power source. The power source may be selected from direct current and systems generating microwaves and radio-frequency, preferably systems generating radiofrequency, more preferably capacitively coupled radiofrequency.

EXAMPLES

This invention will be better understood in light of the following examples which are given for illustrative purposes only and do not intend to limit the scope of the invention, which is defined by the attached claims.

Example 1: Preparation of Graphene and Graphene Oxide Films

A standard capacitive plasma PECVD device provided with a custom processing chamber was used. The power of the plasma reactor was 300 W and the pressure inside the chamber was set to $10^{-5}$ bar. Ethylene gas was introduced into the chamber, which contained a glass substrate, with a flow of 10 sccm for 5 seconds or more, depending on the number of desired layers of Gr to be produced.

In order to produce GrO, a single flash of oxygen at 10 sccm for 60 seconds is performed before conducting the above steps.

Example 2: Analysis and Properties of Graphene and Graphene Oxide Films

The Gr and GrO obtained according to Example 1 were analyzed to confirm their crystal structure.

Various experiments were further performed to measure the properties of the as-grown graphene and graphene oxide. When needed, the method of Example 1 was reproduced directly on the substrate used in these experiments.
XRD Analysis:

X-ray diffraction patterns of as-grown graphene were carried out on a high resolution D8 Discover Bruker diffractometer (Cu $K_{alpha}$ radiation, 0.154 nm) in rocking 2 teta mode in the range of 5°-90°.

Figure 1:
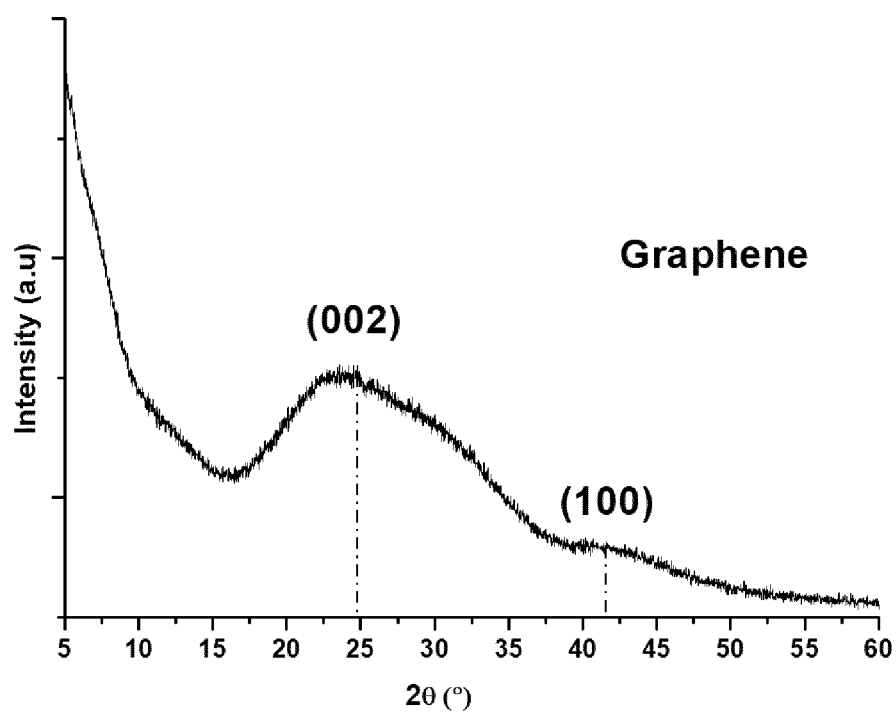
FIGS. 1 and 2 represent the X-Ray Diffraction pattern of Gr and GrO, respectively, as obtained according to this invention.
Figure 2:
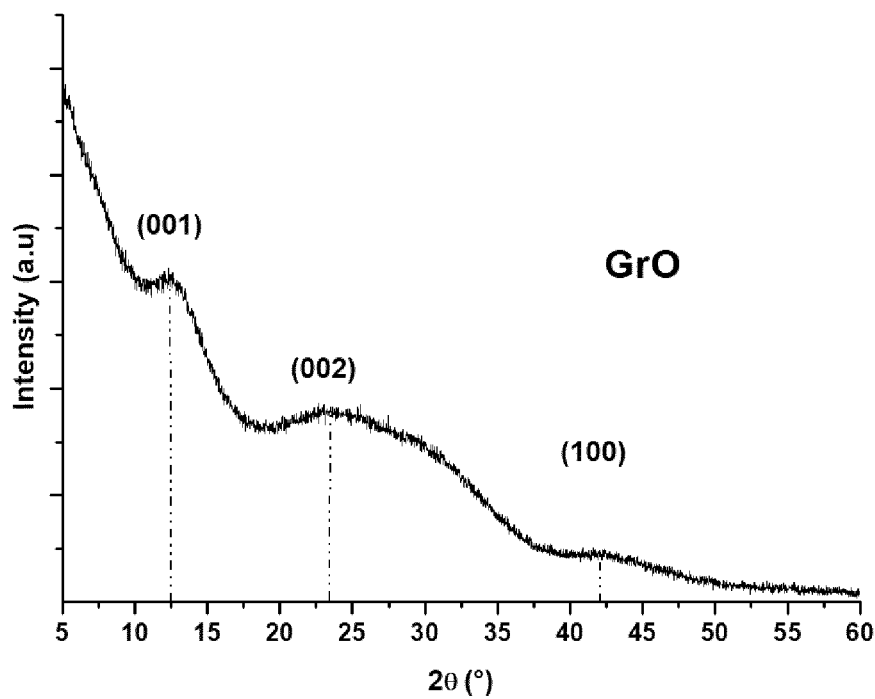

As shown on FIGS. 1 and 2, the Gr and GrO grown by PECVD according to this invention exhibited the same crystal structure as commonly described in the literature.
Raman Spectroscopy:

The Raman spectra of as-grown graphene were recorded at room temperature using a micro-Raman Renishaw spectrometer equipped with a CCD detector. The green laser was used for the excitation (532 nm). The recorded spectra were obtained from 1000 $cm^{-1}$ to 3500 $cm^{-1}$ at seconds exposure time at 0.8 mW laser power integration 5.

Figure 3:
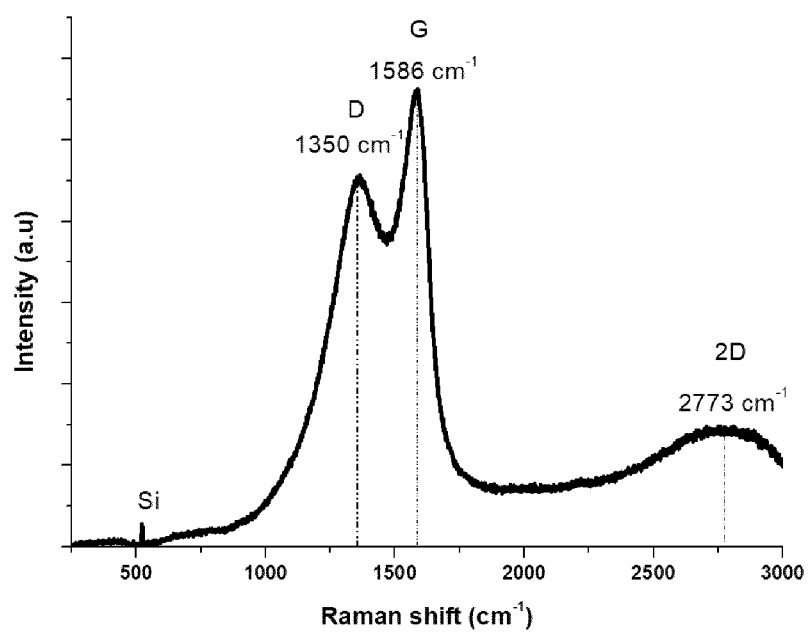
FIG. 3 represents the Raman spectra of Gr deposited on silicon substrate according to this invention.
Figure 4:
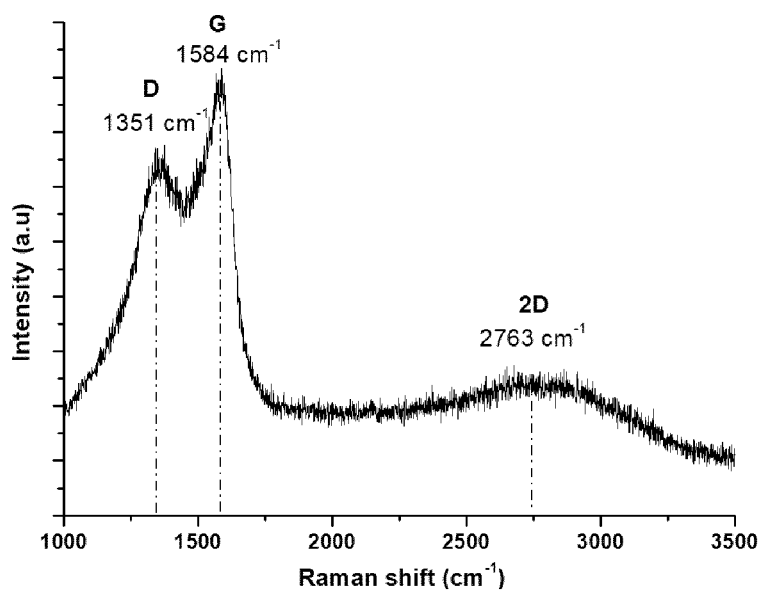
FIGS. 4 and 5 represent the Raman spectra of Gr and GrO deposited on glass substrate according to this invention, showing the vibration modes.
Figure 5:
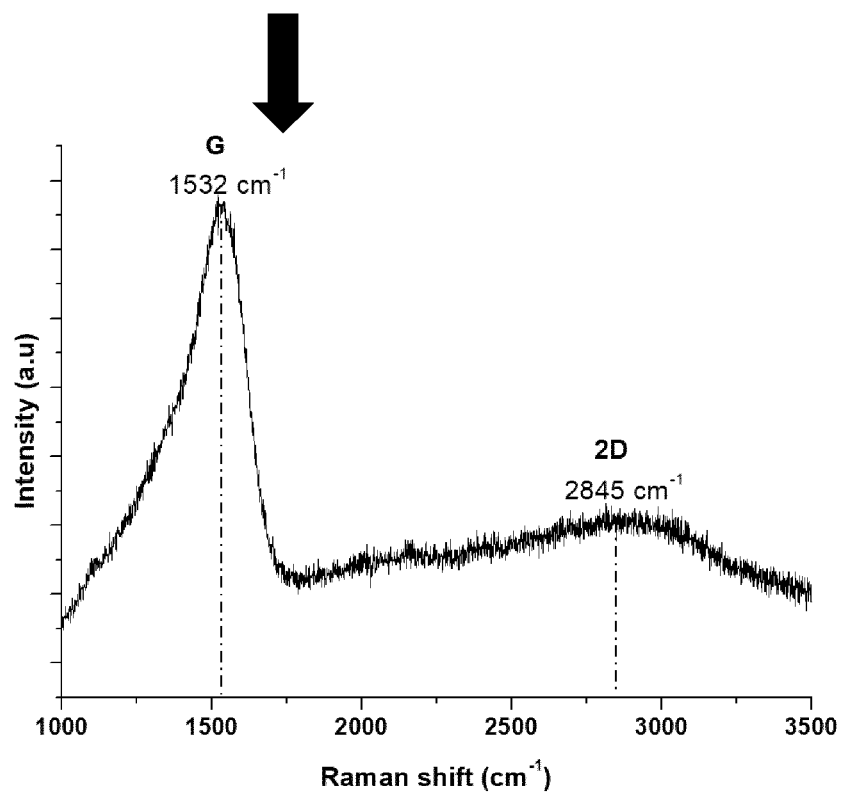

As shown on FIGS. 3 to 5, the Gr and GrO grown by PECVD according to this invention exhibited the same spectra as commonly described in the literature. The presence of the typical vibrations of Gr and GrO is the signature of the successful fabrication. An optimization sequence was followed to develop the two shades separately.
UV-VIS Near IR:

The optical properties of as-grown graphene were obtained using UV-Visible-near InfraRed spectrophotometer JASCO V-670 equipped with a monochromator operating in the spectra range 200-1500 nm at 2 nm step in both reflective and transmission modes.

Figure 6:
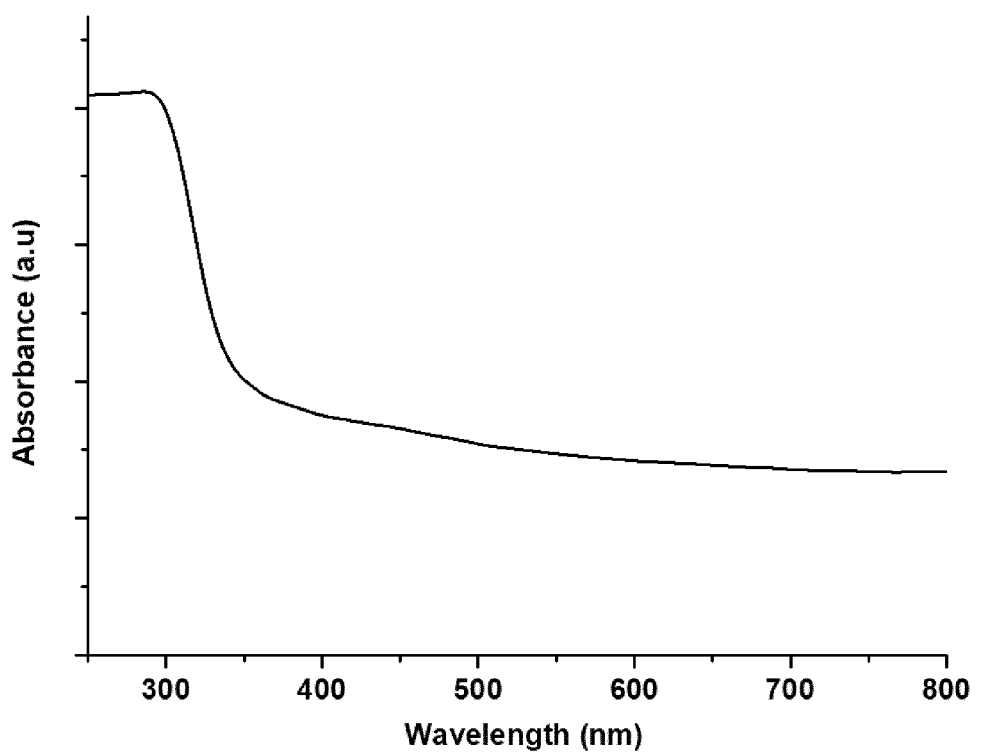
FIG. 6 shows the optical absorbance of Gr deposited on quartz substrate in the range of 200-800 nm.
Figure 7:
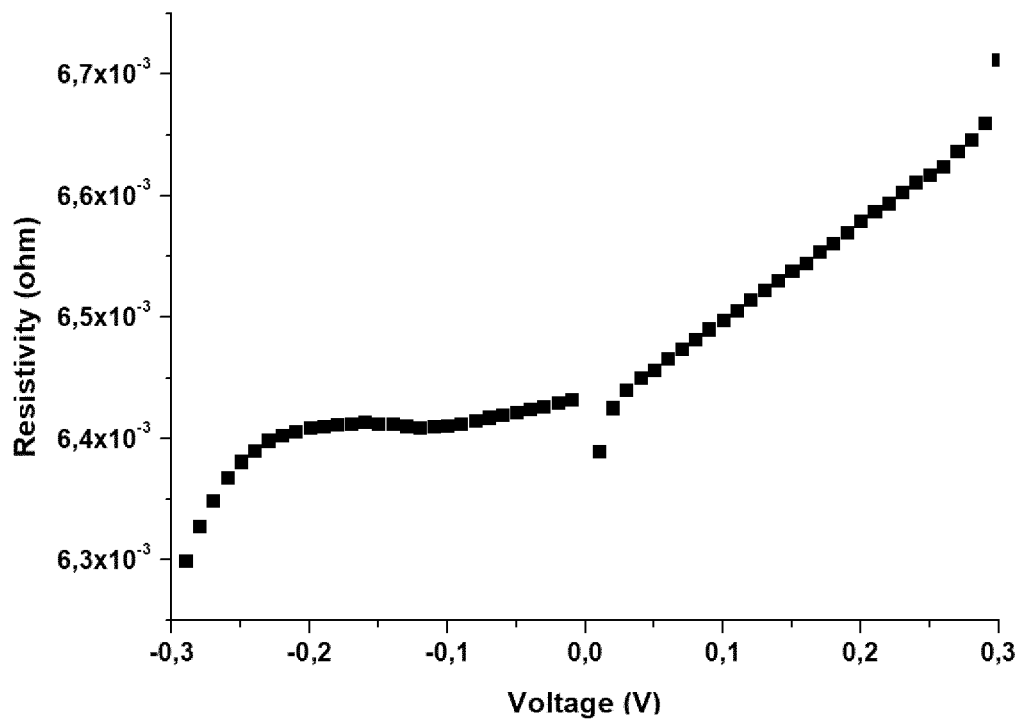
FIG. 7 represents the electrical resistivity of graphene (voltage sweep+/−0.3 V).

FIG. 6 shows the transmittance recorded in the PECVD single-layer Gr of this invention which appears to be similar to that reported in the literature, especially the 270-300 nm transition observed in optical behavior.
Electrical Measurements:

The electric measurements were carried out at room temperature on as-grown graphene using a Solartron Impedance analyzer SI-12060.

+/−8 Volts were applied and the generated currents were measured using 2 probes.

Figure 8:
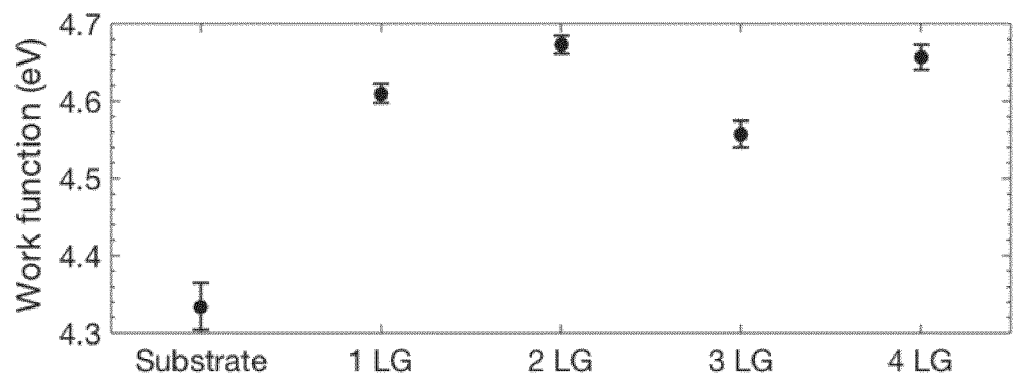
FIG. 8 shows the variation in the work function of a film made of layers of graphene of various thicknesses (between 1 and 4 layers), compared to the uncovered Si substrate used in this experiment.

The electrical measurements performed on the PECVD Gr obtained according to this invention indicate a resistivity (~6 $K\Omega^{-1}$) of the same order of magnitude of the one obtained on few-layers CVD Gr.
Measurement of the Graphene Work Function:

The work function of graphene layers was measured using a scanning probe-based technique so-called Kelvin probe force microscopy (KPFM). This method allows the measurement of a sample's work function with a spatial resolution down to the 5 nm level. To identify the intrinsic nanoscale electronic properties of graphene manufactured according to this invention, films of various thicknesses were prepared on an insulating Si substrate. The work function of graphene layers has been measured depending on the number of layers, as seen in FIG. 8.

Figures 9A, 9B:
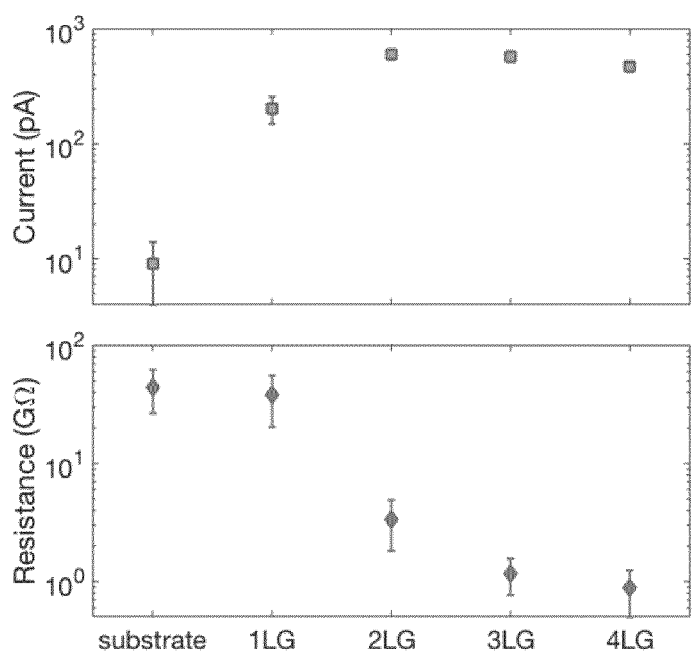
FIGS. 9A and 9B show the variation of current and resistance of graphene films, respectively, depending on their thickness (between 1 and 4 layers).

The work function of the as-graphene shows a 300 meV increase compared to the bare Si substrate. Interestingly, the value of the work function for the films of different thicknesses is somehow stable around a mean value of about 4.65 eV. This value approaches that of the bulk graphite. This observation contrasts with the graphene layers reported in the available literature usually prepared via mechanical exfoliation, epitaxy on SiC or CVD. For these latter types of graphene, the work function has been observed to either increase or decrease with the number of layers depending on the underlying substrate. Those variations were explained by an interfacial transfer of charge between the substrate and the graphene. The relatively stable value of the work function of our graphene films for all films thickness points towards a higher quality of the interface in this case.
Measurement of the Resistance of Graphene at Nano-Scale:

Measuring the conductivity (or resistance) at the nanoscale is performed using a so-called conductive atomic force microscopy (C-AFM). This method used a nanometric conductive AFM probe as scanning electrode connected to a current amplifier, that measured currents flowing through layers (vertically or laterally, depending on the experimental connection to the back electrode) by applying a voltage difference between the AFM tip and the back electrode. The current and resistance of graphene films according to this invention with different thicknesses (1LG to 4LG) were measured, and the results are reported in FIGS. 9A and 9B. As it can be seen from these Figures, the resistance of the graphene films undergoes a decrease of almost one order of magnitude for 2 LG compared to the 1 LG and Si substrate, making thicker graphene films more favorable for in-plane conductivity applications.

The invention claimed is:

1. A process for depositing graphene or graphene oxide onto a substrate from a gaseous source of at least one carbon precursor, using a plasma-enhanced chemical vapor deposition method, characterized in that the carbon precursor consists of ethylene and in that the process is carried out at a temperature between 18 and 40° C. and in the absence of carrier gas.

2. The process according to claim 1, characterized in that the substrate is made of a material selected from: glass; cellulosic materials; synthetic organic materials; a metal; a metal oxide or a metal carbide; and a silicate.

3. The process according to claim 2, characterized in that the cellulosic materials are paper or wood; the synthetic organic material is a polystyrene, a polyester, polyethylene terephthalate or poly(lactic acid); the metal is a metal other than nickel or copper; the metal oxide or metal carbide is a silica, alumina or sapphire; and the silicate is aluminum silicate or magnesium silicate.

4. The process according to claim 1, which does not include a subsequent step of transferring the graphene to another substrate.

5. The process according to claim 1, characterized in that said plasma-enhanced chemical vapor deposition is performed after a single flash of oxygen to form graphene oxide.

6. The process according to claim 1, characterized in that the flow rate of the ethylene is between 5 sccm and 20 sccm.

7. The process according to claim 1, which is performed for a duration allowing the formation of the required number of graphene or graphene oxide layers.

8. The process according to claim 7, wherein the duration is 2 seconds to 10 seconds for forming a single graphene layer and 40 seconds to 80 seconds for forming a single graphene oxide layer.

9. The process according to claim 1, which is carried out at a temperature between 2° and 30° C.

10. The process according to claim 1, which is carried out at a pressure of between $1.33 \times 10^{-5}$ bar and $4 \times 10^{-5}$ bar.

11. The process according to claim 10, wherein the pressure is about $1.8 \times 10^{-5}$ bar.

12. The process according to claim 1, characterized in that the power provided to the plasma is between 150 W and 400 W.

13. The process according to claim 12, wherein the power provided to the plasma is about 300 W.

* * * * *